US008756406B1

(12) United States Patent  (10) Patent No.: US 8,756,406 B1
Khan et al.  (45) Date of Patent: *Jun. 17, 2014

(54) METHOD AND APPARATUS FOR PROGRAMMABLE COUPLING BETWEEN CPU AND CO-PROCESSOR

(71) Applicant: Marvell International Ltd., Hamilton (BM)

(72) Inventors: Moinul Khan, Austin, TX (US); Mark Fullerton, Austin, TX (US); Arthur Miller, Austin, TX (US); Anitha Kona, Austin, TX (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/739,512

(22) Filed: Jan. 11, 2013

Related U.S. Application Data

(63) Continuation of application No. 12/275,981, filed on Nov. 21, 2008, now Pat. No. 8,359,462.

(60) Provisional application No. 60/989,665, filed on Nov. 21, 2007.

(51) Int. Cl.
  *G06F 9/30* (2006.01)
  *G06F 9/38* (2006.01)

(52) U.S. Cl.
  USPC .......................................... 712/241; 712/215

(58) Field of Classification Search
  USPC .................... 712/32, 34, 36, 214, 215, 241
  See application file for complete search history.

(56) References Cited

U.S. PATENT DOCUMENTS

| | | |
|---|---|---|
| 5,029,073 A | 7/1991 | Takaya et al. |
| 5,197,140 A | 3/1993 | Balmer |
| 5,471,592 A | 11/1995 | Gove et al. |
| 5,475,856 A | 12/1995 | Kogge |
| 5,507,027 A | 4/1996 | Kawamoto |
| 5,522,083 A | 5/1996 | Gove et al. |
| 5,566,341 A | 10/1996 | Roberson et al. |
| 5,581,773 A | 12/1996 | Glover |
| 5,634,047 A | 5/1997 | Getzlaff et al. |
| 5,652,903 A | 7/1997 | Weng et al. |
| 6,260,088 B1 | 7/2001 | Gove et al. |
| 6,950,929 B2 | 9/2005 | Chung et al. |
| 7,158,571 B2 | 1/2007 | Wang et al. |
| 7,181,070 B2 | 2/2007 | Petrescu et al. |
| 7,200,741 B1 | 4/2007 | Mine |
| 7,330,964 B2 | 2/2008 | Tran et al. |
| 7,756,347 B2 | 7/2010 | Petrescu et al. |
| 8,095,775 B1 | 1/2012 | Khan et al. |
| 2002/0101930 A1 | 8/2002 | Wang et al. |
| 2007/0079351 A1 | 4/2007 | Wang et al. |
| 2007/0113058 A1 | 5/2007 | Tran et al. |
| 2008/0071996 A1 | 3/2008 | Ohmori et al. |
| 2010/0011339 A1 | 1/2010 | Eichenberger et al. |

*Primary Examiner* — Aimee Li

(57) ABSTRACT

In one embodiment the present invention includes a method and apparatus for enabling a main core and one or more co-processors to operate in a de-coupled mode, thereby facilitating the execution of two or more instruction threads in parallel. A co-processor, according to an embodiment of the invention, has a coupling manager including a loop buffer for storing instructions which can be independently fetched and executed by the co-processor when operating in de-coupled mode. In addition, the coupling manager includes a loop descriptor and a counter/condition descriptor. The loop descriptor and condition descriptor work in conjunction with one another to determine what, if any, action should be taken when a co-processor is in a particular processing state, for example, as indicated by a counter keeping track of loop processing.

16 Claims, 9 Drawing Sheets

Coupled Execution of ARM and SIMD-co-processor

| | ARM | SIMD Engine (1st Co-processor) |
|---|---|---|
| 1 | | WLDRD wR0, [r0] |
| 2 | SUBS r12, r12, #1 | |
| 3 | | WLDRD wR1, [r0, #8] |
| 4 | ADD r0, r0, r1 | |
| 5 | ADD r3, r3, r4 | |
| 6 | | WLDRD wR5, [r0] |
| 7 | | WLDRD wR6, [r0, #8] |
| 8 | ADD r0, r0, r1 | |
| 9 | | WLDRD wR2, [r2], #8 |
| 10 | | WALIGNR0 wR4, wR0, wR1 |
| 11 | | WLDRD wR3, [r2], #8 |
| 12 | | WALIGNR1 wR1, wR0, wR1 |
| 13 | | WAVG2BR wR4, wR1, wR4 |
| 14 | | |
| 17 | CONT...... | |
| 18 | | WAVG2BR wR9, wR6, wR9 |
| 19 | | WADDSUBBUS wR0, wR0, WR2 |
| 20 | | WADDSUBBUS wR6, wR6, WR8 |
| 21 | | WADDSUBBUS wR1, wR1, WR3 |
| 22 | | WADDSUBBUS wR5, wR5, WR7 |
| 23 | | WPACKHUS wR4, wR0, wR1 |
| 24 | | WPACKHUS wR9, wR5, wR6 |
| 25 | | WSTRD wR4, [r3] |
| 26 | ADD r3, r3, r4 | |
| 27 | | WSTRD wR9, [r3] |
| 28 | Bne LOOP_BEGIN | |

FIG. 3 (PRIOR ART)

Coupled Execution of ARM and SIMD-co-processor with SCU
managing data

| | ARM9 | SIMD Engine (1st Coprocessor) | Stream Control Unit (2nd Coprocessor) |
|---|---|---|---|
| 1 | | | WLDRD wR0, [r0] |
| 2 | SUBS r12, r12, #1 | | |
| 3 | | | WLDRD wR1, [r0, #8] |
| 4 | ADD r0, r0, r1 | | |
| 5 | ADD r3, r3, r4 | | |
| 6 | | | WLDRD wR5, [r0] |
| 7 | | | WLDRD wR6, [r0, #8] |
| 8 | ADD r0, r0, r1 | | |
| 9 | | | WLDRD wR2, [r2], #8 |
| 10 | | WALIGNR0 wR4, wR0, wR1 | |
| 11 | | | WLDRD wR3, [r2], #8 |
| 12 | | WALIGNR1 wR1, wR0, wR1 | |
| 13 | | WAVG2BR wR4, wR1, wR4 | |
| 14 | | | |
| 17 | CONT...... | | |
| 18 | | WAVG2BR wR9, wR6, wR9 | |
| 19 | | WADDSUBBUS wR0, wR0, WR2 | |
| 20 | | WADDSUBBUS wR6, wR6, WR8 | |
| 21 | | WADDSUBBUS wR1, wR1, WR3 | |
| 22 | | WADDSUBBUS wR5, wR5, WR7 | |
| 23 | | WPACKHUS wR4, wR0, wR1 | |
| 24 | | WPACKHUS wR9, wR5, wR6 | |
| 25 | | | WSTRD wR4, [r3] |
| 26 | ADD r3, r3, r4 | | |
| 27 | | | WSTRD wR9, [r3] |
| 28 | Bne LOOP_BEGIN | | |

FIG. 4 (PRIOR ART)

METHOD AND APPARATUS FOR PROGRAMMABLE COUPLING BETWEEN CPU AND CO-PROCESSOR

CROSS REFERENCE TO RELATED APPLICATIONS

This is a Continuation of application Ser. No. 12/275,981 filed on Nov. 21, 2008, now issued as U.S. Pat. No. 8,359,462, which is issued as U.S. Pat. No. 8,359,462 on Jan. 22, 2013. The disclosure of the prior application is hereby incorporated by reference herein in its entirety.

BACKGROUND

The present invention relates to microprocessors, and in particular, to an apparatus and method for the programmable coupling between a central processing unit (CPU) and one or more co-processors.

Microprocessors based on the ARM architecture typically allow for only a single thread of instruction for any thread or process that is executing at a particular time. Frequently, an ARM microprocessor is implemented to utilize single-instruction issue logic for dispatching instructions down a single processing pipeline. Accordingly, when there are one or more co-processors present, the primary ARM processor (referred to herein as the main core) and the co-processors work serially on the same thread of instruction. This mode of operation is generally referred to as a "coupled" mode of operation, indicating that the one or more co-processors are tightly coupled with the primary processor, or main core. FIG. 1 illustrates an example implementation of a co-processor 10 and an ARM main core 12 configured to operate in coupled mode. As illustrated in FIG. 1, the co-processor is completely dependent upon the main core for receiving instructions (e.g., via instruction path 14) and data (e.g., via load/store path 16).

With single-instruction issue logic, only one instruction gets issued to an instruction pipeline per instruction cycle. With multi-instruction issue logic, it is possible to issue multiple instructions, and hence, more than one processing pipeline may be issued an instruction during a single instruction cycle. However, the nature of a typical application is such that an instruction thread is more likely to occupy one of the co-processors more than the other co-processor(s) or the main core. For instance, consider an ARM main core coupled with a SIMD (single instruction, multiple data) integer co-processor, such as a Wireless MMX™ co-processor. While executing the instructions of a video-intensive application, the instructions for performing the video processing are generally executed on the Wireless MMX™ co-processor. Accordingly, most of the instructions execute on the Wireless MMX™ co-processor, and in most of the instruction cycles the main core pipeline is empty or used for loading data to the Wireless MMX™ co-processor. Each instruction cycle for which the main core pipeline has an empty instruction slot (referred to as an idle slot, or stall cycle) represents a processing inefficiency.

FIG. 2 provides a simplified timing diagram to illustrate the general nature of the problem. In FIG. 2, the line designated with reference number 18, going from left to right, represents the passage of time. The line designated with reference number 20 represents the processing of a single instruction thread over a period of time. Specifically, the line designated with reference number 20 indicates whether the main core or the co-processor is actively executing instructions of a particular instruction thread at any given moment in time. For instance, from the beginning (time T=0), the instruction thread (represented by line 20) is being processed by the main core. However, when a particular instruction for the co-processor is encountered, processing of the instruction thread eventually passes to the co-processor. For instance, in FIG. 2 processing passes from the main core to the co-processor at time T=1. During the time that the co-processor is processing the instruction thread, the main core is idle (as indicated by the dotted line designated with reference number 22). Eventually, when the co-processor has completed processing its portion of the instruction thread, processing of the instruction thread will pass back to the main core. For instance, in FIG. 2 processing passes from the co-processor back to the main core at time T=2. As illustrated in FIG. 2, at any particular moment in time, either the main core or the co-processor is idle, thereby introducing inefficiency into the system.

FIGS. 3 and 4 illustrate tables showing examples of the idle instruction slots that are introduced into a main core pipeline during the processing of a video-intensive application. As illustrated in the table of FIG. 3, each table entry in the column with heading "ARM" represents an instruction slot of a main core pipeline for an instruction cycle corresponding with the particular row of the table entry. Similarly, in the table of FIG. 3, each table entry in the column with heading "Co-Processor" represents an instruction slot of the main core pipeline during an instruction cycle corresponding with the particular row of the table entry. For example, as illustrated in the table of FIG. 3, the row labeled as row 1 (representing instruction cycle 1) indicates that the instruction slot of the main core pipeline corresponding with the main core is empty—indicating a stall cycle—while the instruction slot of the main core pipeline corresponding with the co-processor contains an instruction, "WLDRD wR0, [r0]". From the table shown in FIG. 3, it can be seen that fifty percent of the instruction slots are empty. As such, a video-intensive application executing on an ARM core coupled with a co-processor leaves much to be desired in terms of processing efficiency.

The problem is aggravated ever further when the main core is coupled with multiple co-processors. In FIG. 4, a table showing examples of the idle instruction slots for a main core pipeline of a main core coupled with two co-processors is shown. In particular, a second co-processor representing a data management unit or stream control unit has been added. In this case, the stream control unit processes instructions that "feed" data to the SIMD co-processor, thereby alleviating the main core from this task. As a result, the instruction slot for the main core has even more idle slots. As illustrated in FIG. 4, seventy-eight percent of the instruction cycles of the main core have an idle slot. Again, these idle slots represent a processing inefficiency.

SUMMARY

Embodiments of the present invention improve the processing efficiency of an ARM main core with one or more co-processors. In one embodiment, the present invention includes a method and a processor for enabling a main core and one or more co-processors to operate in a de-coupled mode, thereby facilitating the execution of two or more instruction threads in parallel. In response to identifying one or more instructions for execution by a co-processor during processing of a first instruction thread at a main core, the processor loads a loop buffer of the co-processor with the one or more instructions of the first instruction thread. This permits a co-processor engine of the co-processor to fetch instructions from the loop buffer and to execute those instructions independent of the main core. The main core simultaneously executes a second instruction thread while the co-processor executes the one or more instructions loaded into the loop buffer.

In another aspect of the invention, the one or more instructions loaded into the loop buffer comprise an instruction loop.

In another aspect of the invention, the co-processor engine is a SIMD co-processor engine configured to operate on multiple data items by executing a single instruction.

In another aspect of the invention, the main core loads a loop descriptor with a loop description including a loop count indicating the number of times the instruction loop is to be executed and instruction addresses for the first and last instruction of the instruction loop. The co-processor utilizes the loop description in counting the number of times the instruction loop has been executed by the co-processor.

In another aspect of the invention, the loop description includes a counter identifier to identify a counter to be utilized by the co-processor in counting the number of times the instruction loop has been executed by the co-processor.

In another aspect of the invention, the main core loads a counter descriptor with an instruction specifying both a condition and an action, wherein the action is to be performed by the co-processor when the condition is satisfied by the counter identified by the counter identifier in the loop description. In one embodiment the action may include setting a co-processor flag, which, when read by the main core, will indicate to the main core a co-processor processing status for a particular instruction loop, ii) generating an interrupt request to interrupt the main core, or iii) remaining idle. Finally, in one embodiment of the invention, the loop buffer is configured to operate as a first-in first-out buffer.

The following detailed description and accompanying drawings provide a better understanding of the nature and advantages of the present invention.

BRIEF DESCRIPTION OF THE DRAWINGS

FIGS. 3 and 4 illustrate tables showing examples of the idle instruction slots that are introduced into a main core pipeline during the processing of a video-intensive application.

DETAILED DESCRIPTION

Described herein are techniques for programmatically de-coupling and re-coupling a general-purpose processor with one or more co-processors. In the following description, for purposes of explanation, numerous examples and specific details are set forth in order to provide a thorough understanding of the present invention. However, the present invention as defined by the claims may include some or all of the features in these examples alone or in combination with other features described below, and may further include modifications and equivalents of the features and concepts described herein.

In one aspect, the present invention provides an apparatus and method for programmatically de-coupling and re-coupling a general-purpose processor and one or more co-processors, thereby temporarily enabling the general-purpose processor and the one or more co-processors to operate on multiple instruction threads independently of one another. For instance, during the decoupled mode of operation the general-purpose processor and the co-processor operate on two instruction threads in parallel. This de-coupling may occur, for example, when the general-purpose processor detects or identifies one or more instructions representing a loop to be processed by a co-processor. In one embodiment, the co-processor may be a SIMD (single instruction, multiple data) processor that operates on several blocks of data at once. Accordingly, de-coupling the co-processor to execute a first instruction thread independently of the main core increases the overall efficiency of the processing apparatus by freeing up the main core to execute a second instruction thread while the co-processor is busy with the first instruction thread. When the co-processor completes processing of the first instruction thread, the main core and the co-processor may once again enter into a coupled mode of operation.

Figure 5:
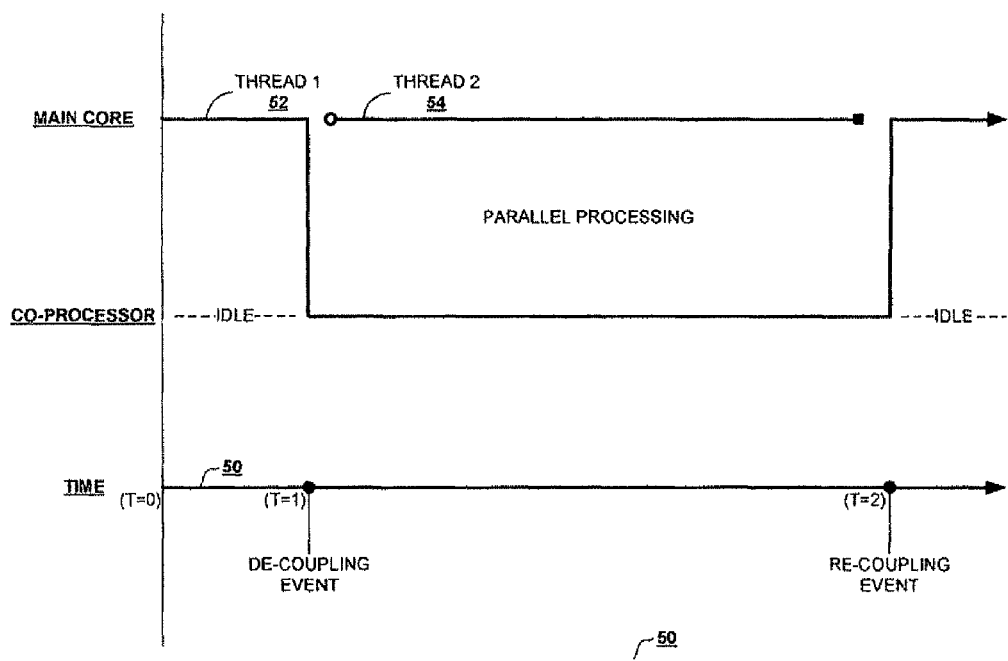
FIG. 5 illustrates a simplified timing diagram showing how a main core and co-processor process with a coupling manager process two instruction threads in parallel, according to an embodiment of the invention.

FIG. 5 illustrates a simplified timing diagram showing how a general purpose processor (e.g., main core) and co-processor with a coupling manager process two instruction threads in parallel, according to an embodiment of the invention. As illustrated in FIG. 5, the line designated with reference number 50, going from left to right, represents the passage of time. The line designated with reference number 52 represents the processing of a first instruction thread over a period of time. Specifically, the line designated with reference number 52 indicates whether the main core or the co-processor is actively executing the instructions of the first instruction thread at any given moment in time. For instance, from the beginning (time T=0), the instruction thread (represented by line 50) is being processed by the main core. However, when a particular instruction for the co-processor is encountered, processing of the instruction thread eventually passes to the co-processor. For instance, in FIG. 5 processing passes from the main core to the co-processor at time T=1, which is noted as a de-coupling event. As described in greater detail below, a de-coupling event involves a main core programming a coupling manager with the necessary instructions and data to operate independently in a de-coupled mode.

Figure 1:
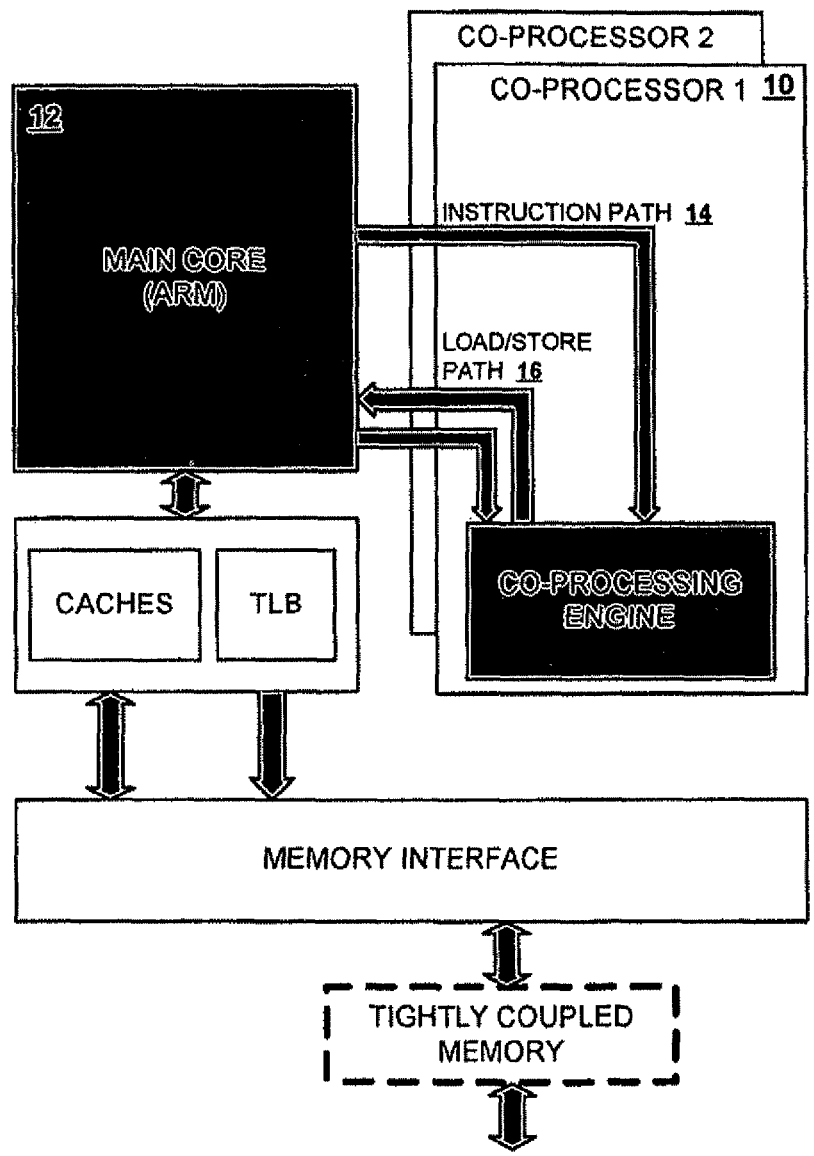
FIG. 1 illustrates an example implementation of a co-processor and an ARM main core configured to operate in coupled mode.
Figure 2:
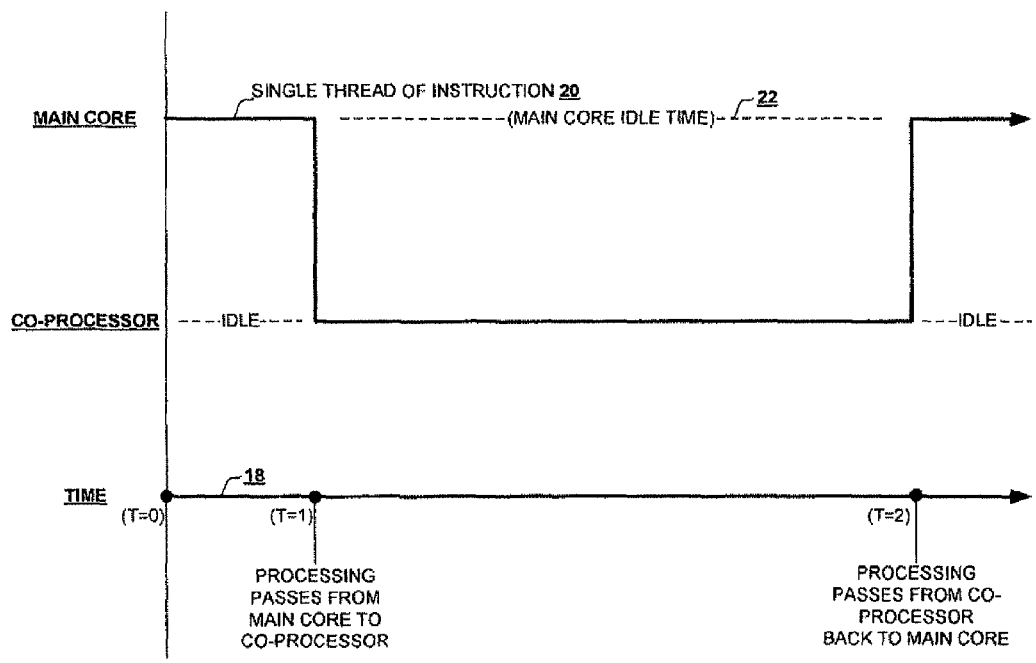
FIG. 2 illustrates a simplified timing diagram to illustrate the idle time experienced by a main core and a co-processor with some architectures.

During the time that the co-processor is processing the instruction thread, the main core initiates execution of a second instruction thread, as indicated by the line designated with reference number 54. Eventually, when the co-processor has completed processing the first instruction thread (represented by the line designated with reference number 52), processing of the first instruction thread will pass back to the main core. For instance, in FIG. 5 processing of the first instruction thread passes from the co-processor back to the main core at time T=2. As illustrated in FIG. 5, during the time between time T=1 and T-2, the main core and the co-processor are operating in a decoupled mode and are able to execute two separate instruction threads in parallel. This is in contrast to the timing diagram of FIG. 2, where the main core is essentially idle while the co-processor is processing the single thread of instructions.

Figure 6:
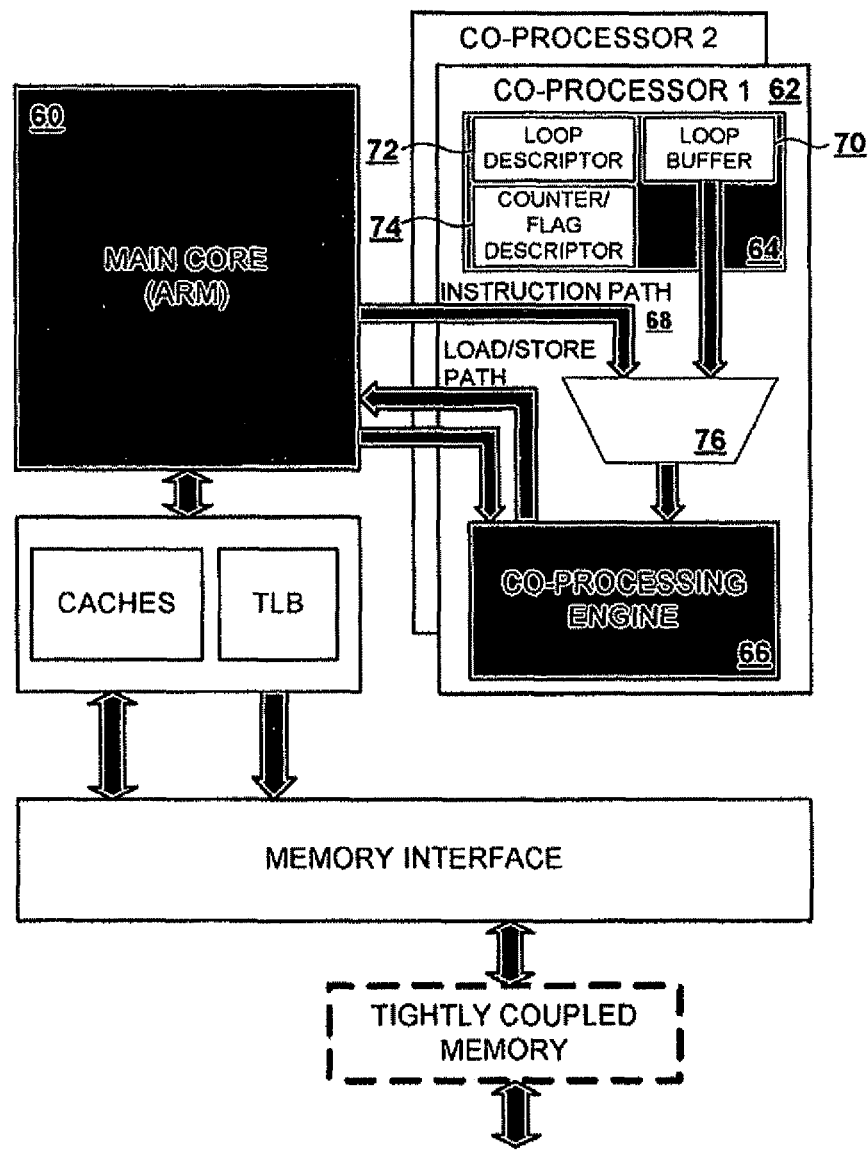
FIG. 6 illustrates an example implementation of a main core and a co-processor with a coupling manager for programmatically coupling and de-coupling, according to an embodiment of the invention.

FIG. 6 illustrates an example implementation of an ARM main core 60 and a co-processor 62 with a coupling manager 64 for programmatically coupling and de-coupling, according to an embodiment of the invention. The ARM main core 60 and the co-processor 62 can be implemented within a processing device—e.g., a mobile communication device, such as a cellular phone or personal digital assistant (PDA); a set-top box; a medical device; etc. As illustrated in FIG. 6, the main core 60 is, coupled to a memory interface via an instruction cache and a transaction look-aside buffer (TLB). Accordingly, the main core receives executable instructions from a tightly coupled memory coupled to the memory interface. The main core includes a pipeline (not shown) for processing instructions. As is well known in the art, a pipeline may have several stages. For example, a first instruction may be at the execution stage while a second instruction is fetched, and a third instruction is being decoded. When the main core operates in a coupled mode of operation, an instruction targeted for execution by the co-processor engine 66 passes through the pipeline and is ultimately forwarded, via instruction path 68, to the co-processor 62 for execution. In the coupled mode of operation, as the instruction or instructions are being processed by the co-processor 62, the main core 60 remains idle. For instance, an idle slot occurs in the pipeline.

To improve processing efficiency, the main core 60 and co-processor 62 can enter into a de-coupled mode of operation. As described in greater detail below, the co-processor 62 includes a coupling manager 64 to facilitate changing and managing the different operational modes (e.g., coupled mode and de-coupled mode). In one embodiment of the invention, the coupling manager 64 includes a loop buffer 70, loop descriptor 72 and counter/condition descriptor 74.

In one embodiment of the invention, the loop buffer 70 is a storage area for instructions to be executed by the co-processing engine 66. Accordingly, when the main core 60 detects one or more instructions for execution on the co-processor 62, the main core 60 writes the instructions to the loop buffer 70 of the coupling manager 64, thereby enabling the co-processor 62 to fetch and execute instructions independently, for example, without further assistance from the main core 60. Alternatively, one or more instructions may be loaded into the loop buffer 70 directly from memory via a memory load operation. In any case, once the instructions are loaded into the loop buffer 70, the co-processor 62 can independently fetch and execute the instructions and is therefore temporarily not dependent upon the main core 60 for receiving instructions. In one embodiment of the invention, the instructions may represent a sub-routine or instruction loop. Furthermore, the instructions may be SIMD instructions for execution by a SIMD processor. As such, each instruction in the loop of instructions may operate on multiple blocks of data per instruction execution cycle. In one embodiment of the invention, to minimize the co-processor register space required by the loop buffer 70, the loop buffer 70 is configured as a first-in, first-out, or FIFO, buffer.

As illustrated in FIG. 6, the co-processor 62 includes a multiplexer 76 to select the source of instructions depending upon the operational mode. For example, in one embodiment, when the operational mode is the coupled mode, the multiplexer will be set to forward instructions to the co-processing engine 66 of the co-processor 62 via the instruction path 68. However, when operating in de-coupled mode, the multiplexer 76 will be set to fetch and execute instructions from the loop buffer 70.

In one embodiment of the invention, the loop descriptor 72 is a storage mechanism for storing information related to the instructions that have been loaded into the loop buffer 70. For example, when the instructions in the loop buffer 70 represent an instruction loop, the loop descriptor 72 can be loaded with information about the instruction loop. Specifically, the loop descriptor 72 may include a loop description indicating the number of times (e.g., loops) that a particular instruction loop is to be executed. In addition, the loop description may include the beginning and ending address for the instructions that comprise the loop. Accordingly, the coupling manager 64 can identify when the instruction at the ending address of the loop has been executed, indicating one pass through of the loop. In this way, the coupling manager 64 can increment a counter to keep track of the number of loops that have been processed.

In one embodiment of the invention, the coupling manager 64 includes a counter/condition descriptor 74. The counter/condition descriptor 74 stores an instruction or other data that specifies some condition and an action to be taken when that condition is satisfied. For example, the condition may relate to the status of the processing task being performed by the co-processor 62. The action may indicate what, if anything, the co-processor 62 should do upon encountering the particular processing status. For example, the condition/action pair may specify that the co-processor 62 should interrupt the main core when the co-processor has successfully completed processing a particular set of instructions. Alternatively, the condition/action pair may indicate that the co-processor 62 is to set or clear a status flag, which, when read by the main core, indicates to the main core the processing status of the co-processor 62. In yet another situation, the condition/action pair may indicate that the co-processor 62 is to simply remain idle—in essence, wait—until the main core 60 indicates a next processing step.

Figure 7:
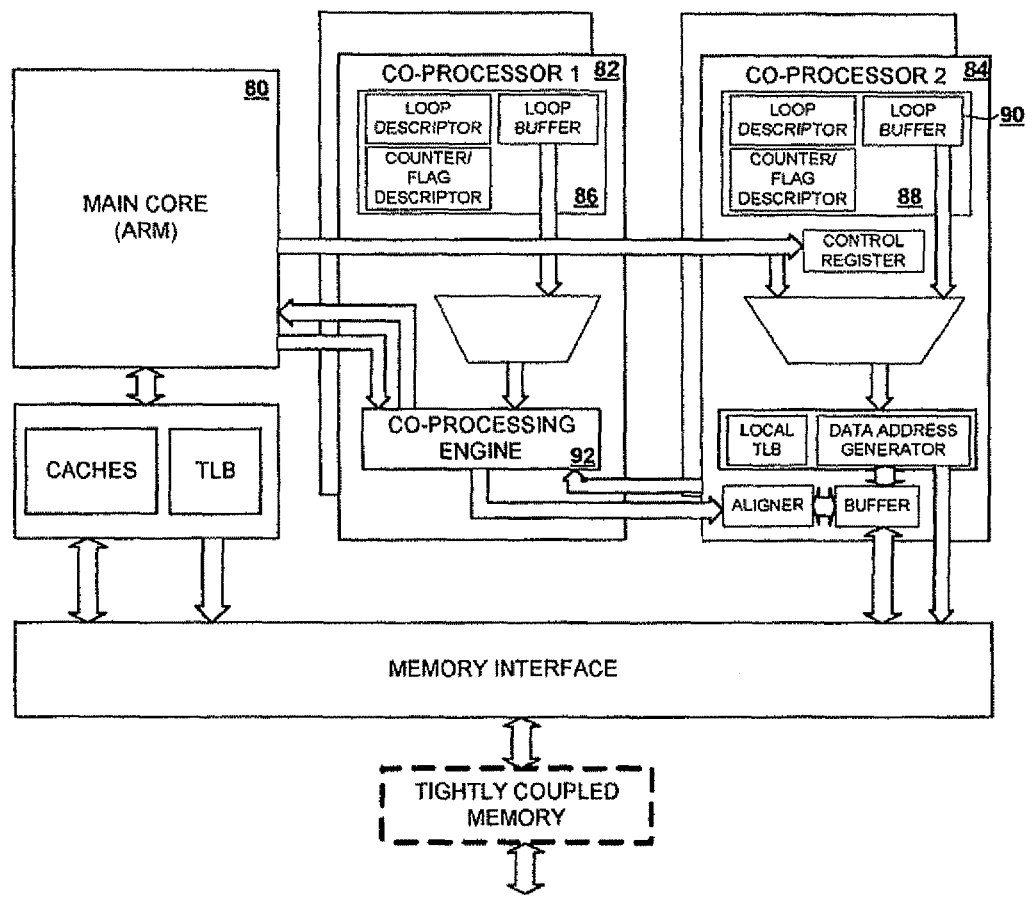
FIG. 7 illustrates an example implementation of a main core and two co-processors with coupling managers for programmatically coupling and de-coupling, according to an embodiment of the invention.

FIG. 7 illustrates an example implementation of a main core 80 and two co-processors (e.g., co-processor 82 and 84), each with its own coupling manager for programmatically coupling and de-coupling with the main core 80, according to an embodiment of the invention. As illustrated in FIG. 7, each of the two co-processors 82 and 84 has its own coupling manager (e.g., 86 and 88). Accordingly, each of the two co-processors can be programmed by the main core to operate on separate instruction threads in parallel. In one embodiment of the invention, co-processor 82 may be a SIMD co-processor, for example, such as a Wireless MMX™ co-processor. As such, co-processor 82 may execute SIMD instructions related to video processing. The second co-processor 84 may be a data management or stream control unit for assisting in the loading of data for processing by the first co-processor. For instance, the stream control unit (co-processor 84) may be consistent with the co-processor disclosed in a commonly-owned U.S. patent application entitled "Streaming Data Engine", Ser. No. 12/270,482 filed on Nov. 13, 2008, and incorporated herein. The stream control unit may initially be loaded with instructions by the main core 80. Then, when operating in a de-coupled mode, the stream control unit (e.g., co-processor 84) may fetch and execute instructions from its loop buffer 90 of its coupling manager, and the instructions may direct the stream control unit to load data into the co-processing engine 92 of the first co-processor 82. This frees the main core 80 from performing the task.

Figure 8:
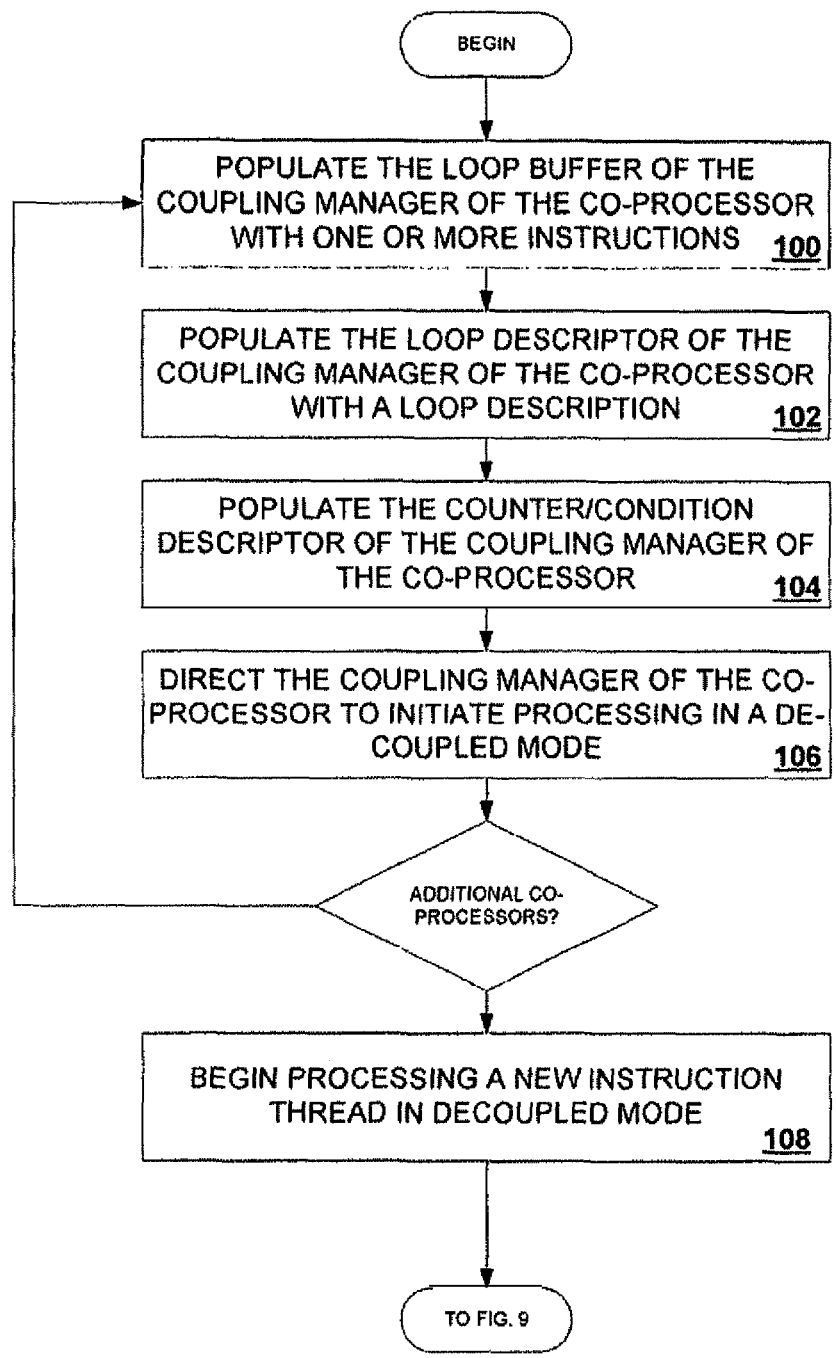
FIG. 8 illustrates an example of a method for programmatically de-coupling one or more co-processors to function in a de-coupled mode, according to an embodiment of the invention.

FIG. 8 illustrates an example of a method for programmatically de-coupling one or more co-processors to function in a de-coupled mode, according to an embodiment of the invention. The method illustrated in FIG. 8 begins at method operation 100, where a loop buffer of a coupling manager of a co-processor is populated with one or more instructions, for instance, an instruction loop. In one embodiment, the main core may load the loop buffer with instructions, or alternatively, a memory load operation may be performed to load instructions into the loop buffer directly from memory. Furthermore, the loop buffer may be configured to operate as a FIFO buffer, thereby limiting the number of registered mapped to the co-processor memory space.

Next, at method operation 102, a loop descriptor of the coupling manager is populated with a loop description. The loop description provides the coupling manager with information about various attributes of the instruction loop, enabling the coupling manager to manage the processing of the instruction loop independent of the main core. For example, the loop description may include a loop count indicating the number of times the instruction loop is to be executed. In addition, the loop description may include instruction addresses for the first and last instruction of the instruction loop. Accordingly, the coupling manager can analyze the address of the executed instructions to determine when the instruction associated with the address of the last instruction in the instruction loop has been executed, signaling one pass through the instruction loop and necessitating an increase to the counter. In this way, the co-processor utilizes the loop description in counting the number of times the instruction loop has been executed by the co-processor. In one embodiment of the invention, the coupling manager will include several counters for use in counting the number of loops that have been executed. Accordingly, the loop description may include a counter identifier that indicates which specific counter of the coupling manager is to be utilized for counting the processing of the instruction loop. (Alternatively, the counter may be tracked until the programmed number of loops has been completed.)

Next, at method operation 104, a counter/condition descriptor is populated. For example, in one embodiment of the invention, the counter/condition descriptor is populated with an instruction or some data that specifies a condition and an action to be taken when the condition is satisfied. For example, the counter descriptor may specify a particular action that is to be taken when a particular counter satisfies some condition. For instance, the counter descriptor may specify, that the co-processor is to interrupt the processing of the main core when a counter reaches some number indicating completion of a certain number of processing loops. Alternatively, the counter descriptor may specify that the co-processor is to simply remain idle upon completing the processing of a certain number of loops. In yet another case, the counter descriptor may specify that a particular flag is to be set or cleared. The flag may, when read by the main core, indicated to the main core a particular processing status of the co-processor. In any case, the condition descriptor, in combination with the loop descriptor and loop buffer, makes it possible for the co-processor to temporarily operate in a de-coupled mode, entirely independent of the main core, At method operation 106, the main core directs the co-processor to begin processing the instructions in the loop buffer in a de-coupled mode. If there are no additional co-processors to be de-coupled, then at method operation 108, the main core begins processing a new instruction thread in the de-coupled mode of operation. However, if an additional co-processor requires de-coupling, the method is repeated until all co-processors are de-coupled.

Figure 9:
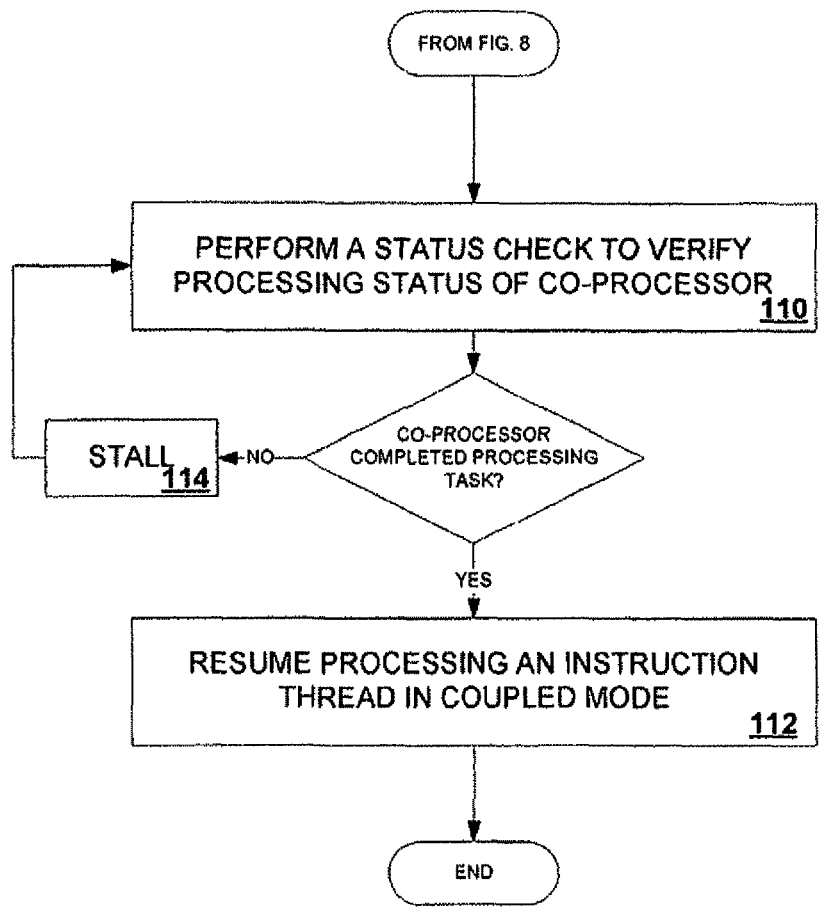
FIG. 9 illustrates an example of a method for programmatically re-coupling a previously de-coupled co-processor, according to an embodiment of the invention.

FIG. 9 illustrates an example of a method for programmatically re-coupling a previously de-coupled co-processor, according to an embodiment of the invention. As illustrated in FIG. 9, a previously de-coupled main core and co-processor can be re-coupled to process an instruction thread in a coupled mode. At method operation 110, the main core performs a status check to determine the processing status of a co-processor. For example, the main core may read a processing status flag of the co-processor to determine whether a particular bit has been set or cleared. In this way, the main core can determine, for example, whether a co-processor has completed processing a particular instruction loop, or alternatively, how many loops of a predetermined number of loops have been executed. If it is determined that the co-processor has completed its processing task, the main core can indicate to the co-processor that the co-processor should re-enter the coupled operating mode. For instance, at method operation 112, after determining that the co-processor has completed its processing task, the main core and the co-processor resume operation in coupled mode. However, if the co-processor has not completed its processing task, the main core can simply stall as indicated by method operation 114, until a later time.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, one or more method operations described above may be performed in a different order (or concurrently) and still achieve desirable results. Based on the above disclosure and the following claims, other arrangements, embodiments, implementations and equivalents may be employed without departing from the scope of the invention as defined by the claims.

What is claimed is:

1. A method for processing data, comprising:
   identifying one or more instructions by a main core;
   loading, by the main core, a loop buffer of a co-processor with the one or more instructions of a first instruction thread for the co-processor to execute the one or more instructions independent of the main core in a first mode, the main core and the co-processor being decoupled in the first mode;
   simultaneously executing a second instruction thread at the main core while the co-processor executes the one or more instructions loaded into the loop buffer while in the first mode;
   verifying that the co-processor is available based on a first state of a flap;
   changing a mode of operation of the co-processor from the first mode to a second mode when the co-processor completes the execution of the one or more instructions, the decoupled main core and co-processor being re-coupled in the second mode; and
   setting the flag to a second state.

2. The method of claim 1, wherein the changing the mode of operation comprises coupling the co-processor with the main core.

3. The method of claim 1, further comprising:
   de-coupling the co-processor from the main core to operate in the first mode.

4. The method of claim 1, further comprising:
   fetching the one or more instructions from the loop buffer by a co-processor engine of the co-processor.

5. The method of claim 1, wherein the loading the loop buffer comprises loading the one or more instructions including an instruction loop.

6. The method of claim 5, further comprising:
   loading a loop descriptor indicating a number of times that the instruction loop is executed and the loop descriptor including instruction addresses for a first instruction and a last instruction of the instruction loop; and counting the number of times from the loop descriptor by the co-processor.

7. The method of claim 6, further comprising:

identifying a counter by a counter identifier from the loop descriptor for counting the number of times.

8. The method of claim 7, further comprising:

loading a counter descriptor with an instruction specifying both a condition and an action, wherein the action is to be performed by the co-processor when the condition is satisfied by the counter identified by the counter identifier in the loop descriptor.

9. A processor, comprising:

a main core configured to identify one or more instructions; and a co-processor configured to execute the one or more instructions during processing of a first instruction thread, the main core configured to load a loop buffer of the co-processor with the one or more instructions of the first instruction thread for the co-processor to execute the one or more instructions independent of the main core in a first mode, the main core and the co-processor being decoupled in the first mode, the main core further configured to simultaneously execute a second instruction thread while the co-processor executes the one or more instructions loaded into the loop buffer while in the first mode, and the co-processor configured to verify that the co-processor is available based on a first state of a flag, change a mode of operation of the co-processor from the first mode to a second mode when the co-processor completes the execution of the one or more instructions, the decoupled main core and co-processor being re-coupled in the second mode, and set the flag to a second state for changing the mode of operation.

10. The processor of claim 9, wherein the co-processor is further configured to couple with the main core for changing the mode of operation.

11. The processor of claim 9, wherein the co-processor is further configured to de-couple with the main core to operate in the first mode.

12. The processor of claim 9, further comprising:

a co-processor engine of the co-processor configured to fetch the one or more instructions from the loop buffer.

13. The processor of claim 9, wherein the main core is further configured to load the one or more instructions including an instruction loop.

14. The processor of claim 13, wherein the main core is further configured to load a loop descriptor indicating a number of times that the instruction loop is executed, the loop descriptor including instruction addresses for a first instruction and a last instruction of the instruction loop, and the co-processor counts the number of times from the loop descriptor.

15. The processor of claim 14, wherein the co-processor is further configured to identify a counter by a counter identifier from the loop descriptor for counting the number of times.

16. The processor of claim 15, wherein the main core is further configured to load a counter descriptor with an instruction specifying both a condition and an action, wherein the action is to be performed by the co-processor when the condition is satisfied by the counter identified by the counter identifier in the loop descriptor.

* * * * *